United States Patent [19]

Park et al.

[11] 4,234,668

[45] Nov. 18, 1980

[54] COMPOSITE SULFUR ELECTRODE CONTAINER AND METHOD OF MANUFACTURE

[75] Inventors: Dong-Sil Park; Manfred W. Breiter, both of Schenectady; Rendall N. King, Johnstown, all of N.Y.

[73] Assignee: General Electric Company, Schenectady, N.Y.

[21] Appl. No.: 898,485

[22] Filed: Apr. 20, 1978

[51] Int. Cl.³ .......................................... H01M 2/02
[52] U.S. Cl. .................................. 429/163; 429/104; 429/176
[58] Field of Search ............... 429/104, 176, 163, 164; 220/450, 456

[56] References Cited

U.S. PATENT DOCUMENTS

| 4,024,320 | 5/1977 | Gibson et al. | 429/104 |
| 4,048,391 | 9/1977 | Tilley et al. | 429/104 |
| 4,084,040 | 4/1978 | King | 429/104 |
| 4,110,516 | 8/1978 | Breiter | 429/104 |
| 4,131,226 | 12/1978 | Breiter et al. | 429/104 X |

Primary Examiner—Anthony Skapars
Attorney, Agent, or Firm—Paul R. Webb, II; James C. Davis, Jr.

[57] ABSTRACT

A composite sulfur electrode container is described which comprises an outer metallic casing portion readily corroded by liquid sulfur and polysulfides, a metallic foil portion substantially corrosion resistant to liquid sulfur and polysulfides bonded to the inner surface of the outer metallic casing portion, and a layer portion of chromium bonded to the opposite surface of the foil portion, the chromium layer portion containing in excess of sixty weight percent chromium. A method is described for making a composite sulfur electrode container.

3 Claims, 4 Drawing Figures

COMPOSITE SULFUR ELECTRODE CONTAINER AND METHOD OF MANUFACTURE

This invention relates to a composite sulfur electrode container and to a method for forming such a container and, more particularly, to such a composite container including an outer metallic casing portion, a metallic foil portion, and a chromium layer portion bonded to its inner surface and to a method of forming such a container.

Sodium-sulfur cells, which operate at elevated temperatures, are known in the prior art as, for example, described in U.S. Pat. No. 3,946,751 issued Feb. 18, 1975, under the title "Cell Casing with a Hermetic Mechanical Seal and a Hermetically Sealed Sodium-Sulfur Cell".

In U.S. Pat. No. 3,959,013, there is described a cathode cell casing portion, a cell casing and a hermetically sealed sodium-sulfur cell. A cathode cell casing portion is formed from a metal selected from aluminum, steel or iron-nickel-cobalt alloys. A corrosion resistant and electronically conductive layer adheres to the inner surface of the container, which layer is selected from the class consisting of molybdenum and graphite. One suitable method of applying and adhering the molybdenum layer to the inner surface of the cell casing portion is to plasma spray such surfaces with a thin layer of molybdenum. The above-identified patents are assigned to the General Electric Company.

In U.S. Pat. No. 3,140,006, there is described a pressure vessel for containing hydrogen or mixtures thereof. In column one, lines 24-30, there is pointed out that vessels for containing hydrogen are known which have a plurality of layers or sections wherein only the inner layer or layers are resistant to hydrogen and the outer section or sections are of carbon steel.

The patent describes an improved construction for a pressure vessel having a suitable opening for admitting a fluid which comprises at least two sections which are not metallurgically bonded, either directly or indirectly, and which have a gas-flow passage therebetween. The inner section is or contains a layer of material which is resistant to deterioration by gas, such as hydrogen absorbed in the metal. The outer section has weep holes inter-connecting the inner surface thereof with the outside of the vessel. The outer section may then be constructed of carbon steel. This description is set forth in column two, lines 6-15 and in column three, lines 56-59. In column three, lines 43-47, it is pointed out that the shell contains an inner section consisting of two layers which may be bonded together as by rolling the layers of different metals to form a unitary sheet. The bonding may also be accomplished by welds.

As opposed to the above patents, the present application describes and claims a structure which has an outer metallic casing portion, a metallic foil portion bonded to the inner surface of the casing portion, and a chromium layer portion bonded to the opposite surface of the foil portion. The present composite sulfur electrode container does not have and would not function with weep holes in the outer casing as described in U.S. Pat. No. 3,140,006.

In U.S. Pat. application Ser. No. 837,381, filed Sept. 28, 1977, now U.S. Pat. No. 4,131,226 under the title "Sulfur Electrode Container Construction and Method of Manufacture", there is described a plurality of sulfur electrode container constructions characterized by mild steel and discrete anti-corrosive liners disposed within the containers and methods of manufacturing each. A discrete liner of a material substantially non-corrodible by liquid sulfur is disposed within a container in substantially contiguous relation with respect to the inner wall of the container for sealing the same from the liquid sulfur therein. A flexible anti-corrosion foil such as 347 stainless steel is rolled as a cladding into the shape of a cylindrical liner so that it fits snugly into the open ended rigid container. The edge margins of the foil are disposed in slightly overlapping relation. The liner can be spot welded to the container along its overlapping edge margins.

In U.S. Patent application Ser. No. 889,046, filed Mar. 22, 1978, under the title "A Sodium-Sulfur Cell Component Protected by a High Chromium Alloy and Method of Forming", there is described an electrically conductive corrosion resistant component for a sodium-sulfur cell which includes a ferrocarbon substrate and a chromium-iron-carbon alloy surface layer bonded to the substrate and containing in excess of 60 weight percent chromium. The alloy surface layer is described further as having an outer layer of contiguous outer and inner chromium-iron-carbon duplex layers, in which the inner layer has a chromium content less than about 50 weight percent and which layer is in direct contact with the substrate.

A method is also described for forming a corrosion resistant layer on a ferrocarbon substrate which includes pack chromizing the substrate by totally submerging it in a solid pack of chromium source and a halide activator at an elevated temperature to generate chromium halide at sufficient vapor pressure to diffuse the chromium into the substrate to form a chromium-iron-carbon alloy surface layer bonded to the substrate containing in excess of about 60 weight percent chromium.

The above-described U.S. applications are assigned to the Electric Power Research Institute, Inc., subject to the reservation of license rights to the General Electric Company. Our present invention is directed to providing an improved composite sulfur electrode container and an improved method of manufacturing such a container over the above-identified patents and patent applications in that there is utilized an outer metallic casing portion, a metallic foil portion bonded to the inner surface of the casing portion, and a chromium layer portion bonded to the opposite surface of the foil portion.

The primary objects of our invention are to provide an improved composite sulfur electrode container and an improved method of manufacturing such a container wherein a self-sealing effect is produced by the foil and layer portions thereby minimizing creeping of the corrosive sulfur or vapor between the foil and layer portions and the outer casing portion of the container.

In accordance with one aspect of our invention, a composite sulfur electrode container includes a metallic outer casing portion, a metallic foil portion, and a chromium layer portion bonded to its inner surface. The foil portion and the chromium layer portion are substantially corrosion resistant to liquid sulfur and polysulfides, while the outer casing portion is readily corroded by liquid sulfur and polysulfides.

These and various other objects, features and advantages of the invention will be better understood from the following description taken in connection with the accompanying drawing in which.

Figure 1:
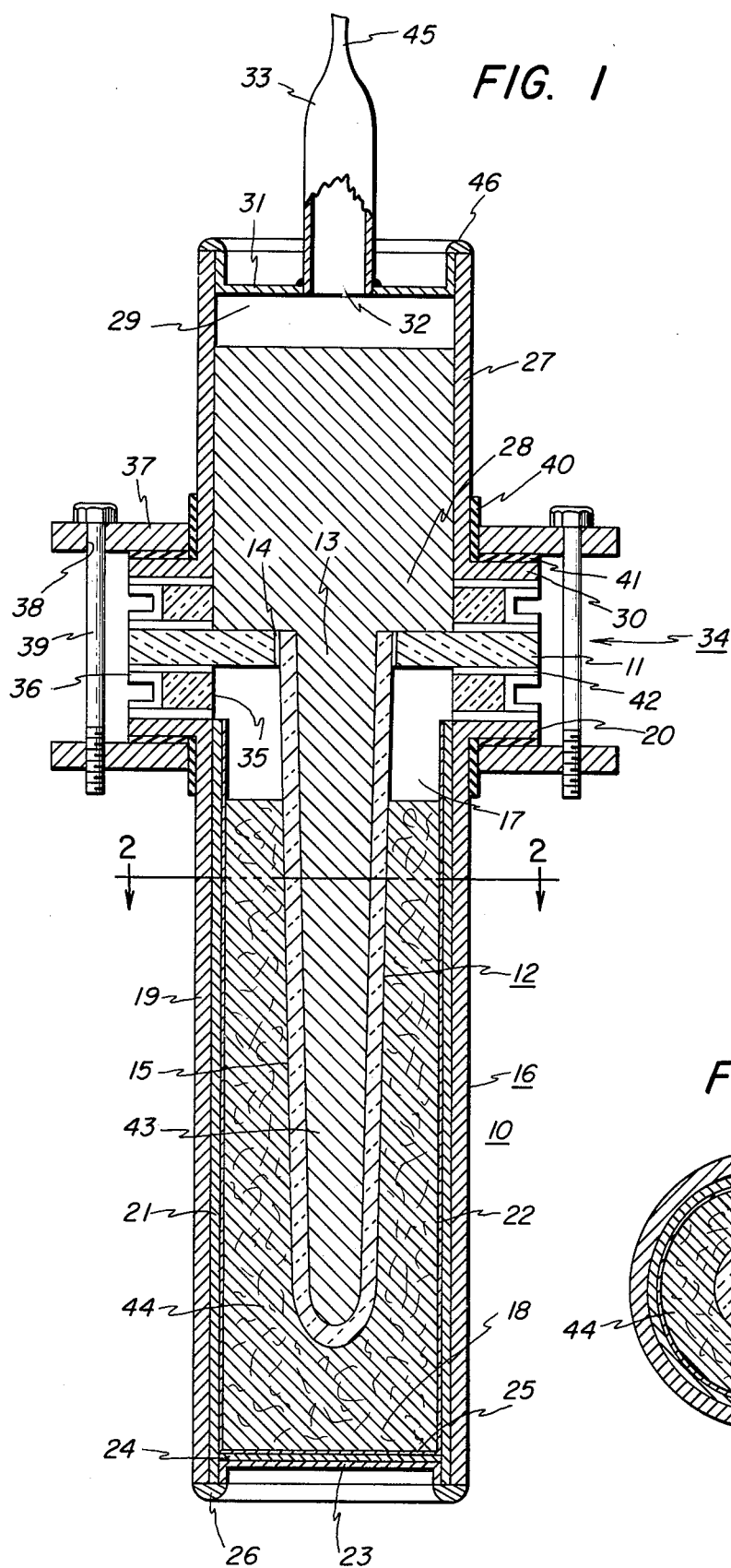
FIG. 1 is a sectional view of a sodium-sulfur cell with a composite sulfur electrode container made in accordance with our invention.

In FIG. 1 of the drawing, there is shown a sodium-sulfur cell 10 of the type described in above-mentioned U.S. Pat. No. 3,946,751 with the improved composite sulfur electrode container of the present invention. Cell 10 has a ceramic ring 11, an inner casing of a solid sodium ion-conductive material 12 with one open end 13, and a glass seal 14 sealing a portion of the outer wall 15 of inner casing 12 adjacent its open end 13 within and to the ceramic ring 11. An improved composite sulfur electrode container 16 has opposite open ends 17 and 18. An outer metallic casing portion 19 readily corroded by liquid sulfur and polysulfides has a flange 20 at open end 17 of container 16. Container 16 surrounds inner casing 12 and is spaced therefrom.

A single metallic foil portion 21 of 347 stainless steel which is substantially corrosion resistant to liquid sulfur and polysulfides, is bonded to the inner surface of outer casing portion 19. A chromium layer portion 22 is bonded to the opposite surface of foil portion 21. The layer portion is substantially corrosion resistant to liquid sulfur and polysulfides. A metallic end cap 23 with a foil portion 24 and chromium layer portion 25 bonded to its inner surface is shown fitted and sealed as by welding at 26 within and adjacent open end 18 of container 16. A sodium container 27 has opposite open ends 28 and 29 and a flange 30 at open end 28. Sodium container 27 extends in an opposite direction to composite sulfur electrode container 16. A metallic end cap 31 for opposite open end 29 of sodium container 27, has a fill opening 32 in end cap 29, and a fill tube 33 affixed to end cap 29 and in communication with fill opening 32.

Sulfur and sodium metallic containers 16 and 27 are shown joined to ceramic ring 11 by a hermetic mechanical seal shown generally at 34 thereby forming a continuous container. Seal 34 comprises a pair of retainer rings 35, each of which is positioned between ceramic ring 11 and an adjacent flange 20 or 30 of containers 16 and 27, respectively. A pair of "C" shaped sealing rings 36 are positioned similarly to rings 35 but surround exteriorly and are spaced from rings 35. The open portion of each "C" shaped sealing ring faces outwardly. A retaining collar 37 is positioned around each container and adjacent to the opposite surface of the casing flange. Each collar 37 has at least a pair of and preferably a plurality of apertures 38 therethrough. The collars are positioned so that the respective apertures 38 are aligned. Threaded fasteners 39, each passing through a pair of associated apertures, are employed to tighten the mechanical seal to produce a hermetic mechanical seal 34. Electrical insulation 40 in the form of fiberglass tape is shown wound around the exterior surface of containers 16 and 27 adjacent the respective flanges 20 and 30 to prevent short-circuiting of the cell by seal 34. Electrical insulation 41 in the form of an iorganic fiber cloth ring is positioned between each flange 20 and 30 and the surface of each associated collar 33 to prevent short-circuiting of the cell by seal 34. While the opposite surfaces of ceramic ring 11 are smooth to insure a good seal, there is shown also a preferred ring 42 of aluminum foil between the opposite surface of retainer ring 35 and sealing ring 36 and the associated surface of ceramic ring 11 to provide a smoother surface. Hermetic mechanical seal 34 is shown in its tightened or hermetic position. A negative electrode 43 of sodium metal is positioned preferably within inner casing 12 and partially within sodium container 27. A positive electrode 44 of a sulfur-carbon plug is positioned preferably within container 16 and is in contact with outer wall 15 of inner vessel 12 and with chromium layer portion 22. A void volume is provided between ceramic ring 11 and the upper portion of positive electrode 44 to provide space for reactant during operation of the cell. Fill tube 33 is shown closed in any suitable manner such as by a weld 45. End cap 31 is affixed to container 27 as by welding at 46. The resulting structure is a hermetically sealed sodium-sulfur cell.

Figure 2:
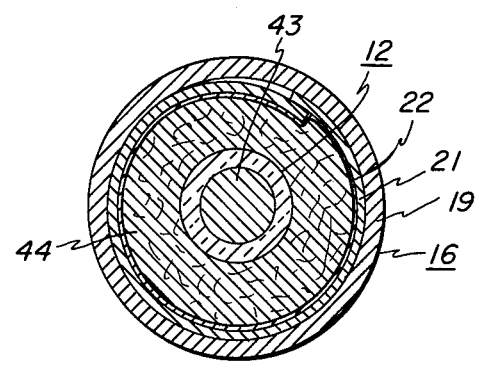
FIG. 2 is a sectional view through the composite sulfur electrode container of FIG. 1 taken on line 2—2 thereof.

In FIG. 2 of the drawing, there is shown a sectional view through the improved composite sulfur electrode container of FIG. 1 taken on line 2—2 thereof. The same numerals are used in the descriptive of FIG. 2 as were employed in the description of FIG. 1. Composite sulfur electrode container 16 surrounds inner casing 12 and is spaced therefrom. Metallic foil portion 21 is bonded to the inner surface of outer metallic casing portion 19. Chromium layer portion 22 is bonded to the opposite surface of foil portion 21. Negative electrode 43 of sodium metal is positioned within inner casing 12. Positive electrode 44 of a sulfur-carbon plug is positioned within container 16 and in contact with outer wall 15 of inner vessel 12.

Figure 3:
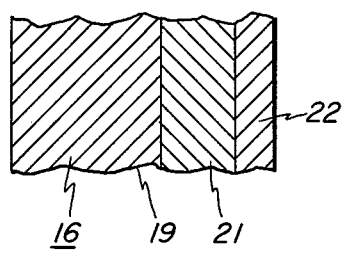
FIG. 3 is an enlarged sectional view of a portion of the composite sulfur electrode container shown in FIG. 1.

In FIG. 3 of the drawing, there is shown an enlarged sectional view of a portion of composite sulfur electrode container 16 which is shown in FIG. 1. Composite sulfur electrode container 16 has an outer metallic casing portion 19 readily corrodible by liquid sulfur and polysulfides. Metallic foil porton 21, which is substantially corrosion resistant to liquid sulfur and polysulfides, is bonded to the inner surface of outer metallic casing portion 19. A chromium layer portion 22, which is substantially corrosion resistant to liquid sulfur and polysulfides is bonded to the opposite surface of foil portion 21.

Figure 4:
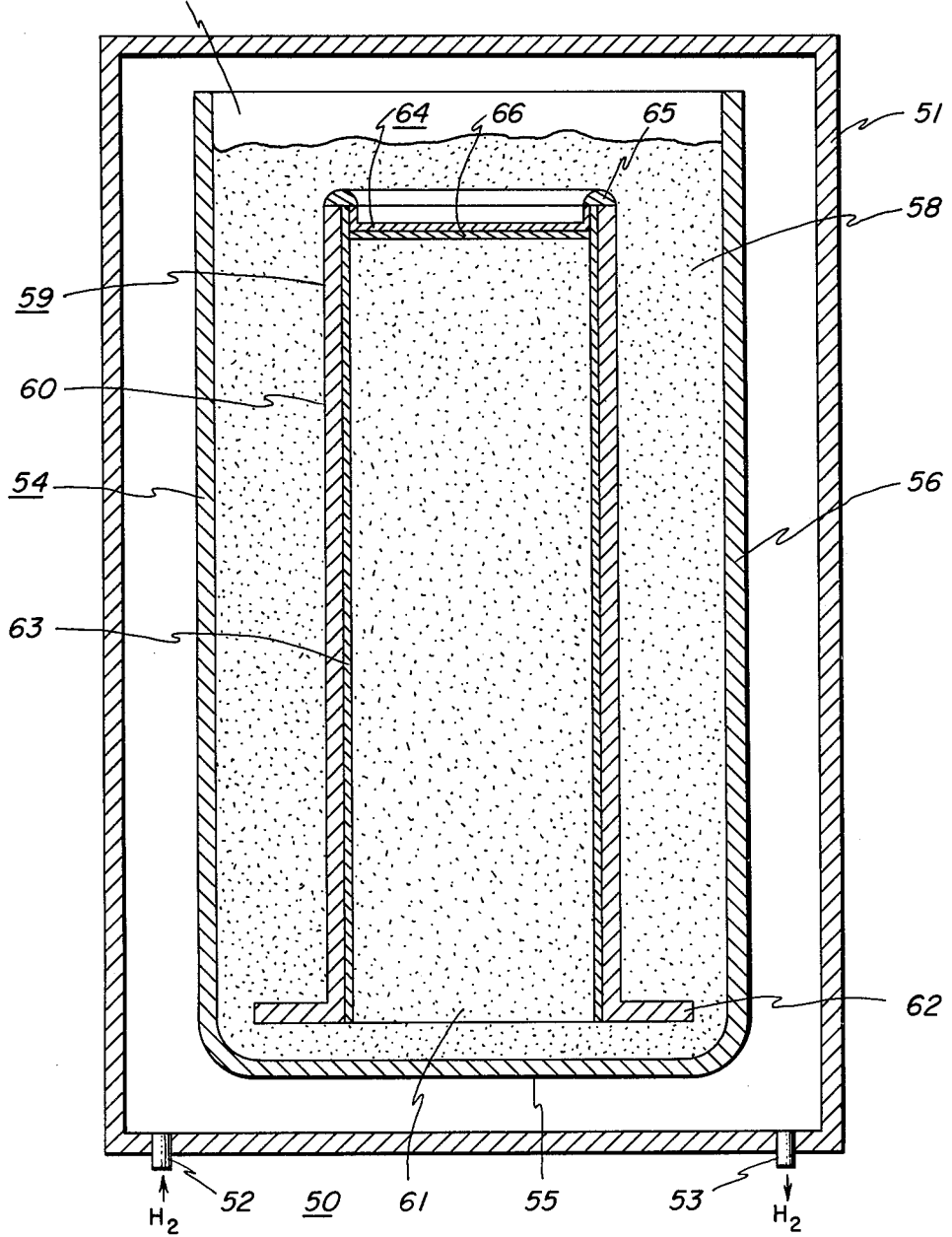
FIG. 4 is a schematic sectional view of apparatus for forming the composite sulfur electrode container of our invention.

In FIG. 4 of the drawing, there is shown a schematic sectional view of an apparatus for forming the composite sulfur electrode container of our invention. Apparatus 50 has an enclosure 51 such as a box type furnace. An inert gas or hydrogen is directed through inlet 52 into the interior of enclosure 51 and removed through an outlet 53 from enclosure 51. A stainless steel retort 54 is positioned within enclosure 51. Retort 54 is shown as having a bottom wall 55 and a side wall 56. The upper end of retort 54 has an open end as shown at 57. A chromizing pack 58 substantially fills retort 54. A suitable chromizing pack 58 includes 10–60 weight percent chromium powder as the chromium source, about 2.8 percent ammonium chloride and 50–80 weight percent alpha-alumina powder as a filler. To avoid sintering of the chromium powder and for economy, it is preferable to employ below 50 weight percent chromium powder. If desired, a ferrochromium alloy may be substituted for chromium as the chromium source. A sulfur electrode container 59 is positioned in an inverted position and totally submerged in chromizing pack 58. A sulfur electrode container comprises an outer metallic casing portion 60 having an open end 61 and a flange 62 at the open end. A single metallic portion 63 of 347 stainless steel is positioned within outer casing portion 60 and has its one surface in contiguous relation to the inner surface of outer casing portion 60. A metallic end cap 64 is positioned within the opposite or upper end of outer casing 60 and sealed to outer casing portion 60 and metallic foil portion 63 by means of a weld 65. End cap 64 has a single metallic foil portion 66 disposed on its inner surface. Enclosure 51 is heated to a suitable temperature from about 850°–1200° C. to produce a chromium layer on the inner surface of foil portion 63 and on the inner surface of foil portion 66. Additionally, the apparatus diffuses chromium into foil portions 63 and 66, and bonds foil portions 63 and 66 to the inner surface of outer metallic casing 60 and end cap 64, respectively.

We found that we could form an improved composite sulfur electrode container which includes an outer metallic casing portion readily corroded by liquid sulfur and polysulfides, such as low carbon steel. Another suitable outer metal casing portion material is nickel. The container has opposite open ends. It may be desirable, depending on the type of composite sulfur electrode container and on the method of joining such container to form a sodium-sulfur battery, to provide an outwardly or inwardly extending flange at one end of outer casing portion. As it is shown in both FIGS. 1 and 2 of the drawing, an outwardly extending flange is employed. Such a flange configuration is used in view of the hermetic mechanical seal employed in the sodium-sulfur battery in which it is used. Since other sealing methods are available for affixing the composite sulfur electrode container as a portion of the sodium-sulfur cell, such an outwardly extending flange might not be required. However, we will describe an embodiment of the composite sulfur electrode container of our invention which can be employed in the cell shown in the Figures of the drawing and described above. A metallic foil portion is provided, which is substantially corrosion resistant to liquid sulfur and polysulfides. Suitable materials for the foil include various stainless steels such as 347 stainless steel, and nickel-chromium alloys. The foil portion is rolled into a cylindrical shape and is positioned within the outer metallic casing whereby the outer surface of the foil portion is in contiguous relation with the inner surface of the outer metallic casing. The edge margins of the foil portion are disposed in a slightly overlapping relation. The foil portion is preferably coextensive with the inner surface of the outer metallic casing. If desired, one or more tack welds may be made to adhere initially the foil to the inner surface of the outer metallic casing.

We found that we could then position a metallic end cap with a foil portion on its inner surface within the open end of the container opposite to the open end having a flange. The metallic end cap is then sealed as by welding within and adjacent the open end of the container. In another embodiment of the invention, the end cap is not positioned in the open end of the container, nor sealed therein until a later step in the formation of the container. We found that we could than chromize the inner surface of the foil portions adjacent the side wall and the end cap and also diffuse chromium into the foil portion. We found further, that the chromizing bonded the foil portion to the inner surface of the outer metallic casing and bonded the chromium layer to the opposite surface of the foil portion. We found further, that the foil portion, after chromizing, would have some additional chromium diffused into the foil during the process, while the chromium layer portion would contain in excess of 60 weight percent chromium.

We found that we could chromize, by pack chromizing method. It will be appreciated that other chromizing processes such as chromizing by chemical vapor deposition from a separate vapor source can be employed. The pack chromizing method included positioning the above described outer metallic casing with foil portion positioned therein and the end cap with foil portion on its inner surface welded thereto in an inverted position within a chromizing pack in a stainless steel retort, which retort is positioned within an enclosure. An inert gas, such as argon or hydrogen, is flowed into and out from the enclosure while the pack is heated to a suitable temperature in the range from 850° to 1150° C. The preferred temperature range is from 950° to 1100° C. At temperatures in excess of 1150° C., it is possible that the chromium layer portion will become too thin for effective protection. Generally, the chromium layer portion should have a thickness two microns or thicker. The time period should be as short as possible from an economy standpoint. However, it is necessary that the time period be sufficient to provide a chromium layer portion having an effective thickness and containing in excess of 60 weight percent chromium. We found that we could provide a suitable chromium layer portion in a period as short as one-half hour to periods of, for example, three to four hours. The preferred time period is one hour. The chromium pack includes a chromium source and a halide activator, preferably amonium chloride or bromide. During the chromizing process, chromium halide is generated whereby chromium is diffused into the foil portion, forms a chromium layer portion on the foil portion, and bonds the foil portion to the inner surface of the outer metallic casing. A suitable chromizing pack includes 10 to 60 weight percent chromium powder as the chromium source, about 2 weight percent amonium chloride and the balance alpha-alumina powder as a filler. To avoid sintering of the chromium powder and for economy, it is preferable to employ below 50 weight percent chromium powder. If desired, a ferrochromium alloy may be substituted for chromium as the source.

We found that it is necessary to provide a heated vapor containing chromium from a chromium source at a sufficient vapor pressure to diffuse chromium into the foil portion, bond the foil portion to the inner surface of the outer metallic casing portion, and form, and bond a chromium layer portion to the opposite surface of the foil portion. The vapor pressure of chromium halide increases with temperature, and varies depending upon the particular halide. A high concentration of the chromium halide adjacent to the inner surface of the outer metallic casing portion with foil portion therein, appears to contribute to a significant extent to the chromizing step. If a sufficient vapor pressure is not employed, the chromium layer portion containing in excess of 60 weight percent chromium is not formed. Thus, the vapor pressure should be sufficient to form a chromium layer portion of a thickness two microns or thicker.

Subsequent to the chromizing, the resulting device is a composite sulfur electrode container made in accordance with our invention.

In the pack chromizing process, the assembly of the outer metallic casing and the end cap with their respective foil portions, is preferably inverted so that the end cap is near the upper portion of the chromium pack. As it is mentioned above, it may be desirable to provide and weld the end cap to the outer metallic casing and its foil portion subsequent to the chromizing process. When this is accomplished, it is necessary to position a sheet of material over the open upper end of the outer metallic casing or over the top of the pack to provide the chromizing step necessary to form our container.

A sodium-sulfur cell is then assembled as above described, employing the improved composite sulfur electrode container of our invention. In the assembly of the composite sulfur electrode container in the sodium-sulfur cell, as shown in FIGS. 1 and 2 of the drawing, the sulfur-carbon plug is inserted within the container and in contact with its chromium layer portion from the opposite open end of the composite sulfur electrode container. The composite sulfur electrode container, including the sulfur-carbon plug, is then hermetically sealed by means of its flange to the ceramic ring in the sodium-sulfur cell.

Examples of composite sulfur electrode containers and method of manufacturing such containers made in accordance with our invention, are set forth below:

EXAMPLE I

A composite sulfur electrode container was formed as above described and as is shown in FIGS. 1 and 2 of the drawing by providing an outer metallic casing portion of low carbon steel having opposite open ends, which container is readily corrodible by liquid sulfur and polysulfides. An outwardly extending flange is provided at one open end of the outer casing. A 2 mil. thick 347 stainless steel foil portion, which is substantially corrosion resistant to liquid sulfur and polysulfides, was formed into a cylinder with overlapping margins and positioned within the outer casing. The outer surface of the foil portion was in substantially contiguous relation with respect to the inner surface of the outer casing. A metallic end cap of low carbon steel having a foil portion disposed on its inner surface was fitted within and adjacent the open end of the casing portion opposite the open end with the flange so that the edge of the end cap was in contact with the inner surface of the foil portion. The end cap was sealed by welding the cap to the foil portion and the outer casing portion to provide an assembly.

The assembly is positioned in a chromizing pack within a stainless steel retort in an inverted position so that the end cap or closed end of the assembly is in the upper part of the chromizing pack. The chromizing pack comprised 40 weight percent chromium, 2 weight percent amonium chloride and the balance alpha-alumina powder. The retort was positioned within an enclosure into and from which hydrogen gas was flowed. The chromizing was carried out at 1050° C. for one hour. The chromizing bonded the foil portion to the inner surface of the outer metallic casing portion, diffused chromium into the foil portion, formed and bonded a chromium layer portion to the opposite surface of the foil portion, which chromium layer portion content was about 80 weight percent chromium. The resulting device was a composite sulfur electrode container made in accordance with our invention.

EXAMPLE II

The composite sulfur electrode container of Example I was employed in a sodium-sulfur cell of the type described above and shown in FIGS. 1 and 2 of the drawing. The cell had a ceramic ring of alpha alumina, an inner casing of solid sodium and beta alumina in tube form with one open end, and a glass seal sealing a portion of the outer wall of the inner casing adjacent its open end within and to the ceramic ring. A sodium container of metal had opposite open ends and a flange at one open end. An end cap was welded to the open end of the sodium container opposite to the open end having a flange. A fill opening was provided in the end cap and a fill tube affixed to the end cap and in communication with the fill opening.

A ring of aluminum foil was positioned on the upper surface of the ceramic ring. A retainer ring is positioned on the upper surface of the aluminum foil and surrounded by "C" shaped sealing ring with its opening facing outwardly. The flange of the sodium container is positioned on the upper surface of both the retainer ring and the "C" shaped sealing ring. Fiberglass tape was wound around the exterior surface of the sodium container adjacent its flange. An inorganic fiber cloth ring was positioned around the upper surface of the flange of the sodium container.

The composite sulfur electrode container of Example I had a sulfur-carbon plug inserted therein through its open end. The sulfur electrode container, with its plug positioned therein surrounded the beta-alumina tube, whereby the tube was fitted into the opening within the sulfur-carbon plug. As described above, the sulfur-carbon plug was positioned on the opposite surface of the ceramic ring in the same manner as was the sodium container. A retaining collar was positioned around each container and adjacent to the opposite surface of the casing portion flange. Each collar had a plurality of apertures therethrough. The collars were positioned so that the respective apertures were aligned. A threaded fastener passed through each pair of associated apertures. These fasteners were then tightened to provide a hermetic mechanical seal for the cell. The threaded fasteners were tightened to a pressure of about 300 lbs. to provide a complete hermetic mechanical seal.

EXAMPLE III

The cell of Example II was positioned in a furnace and heated to a cell operating temperature of 315° C. The cell was charged and discharged over 100 cycles in a completely satisfactory manner. Subsequently, the cell was disassembled and the inner surface of the composite sulfur electrode container was examined. The container showed only nominal amounts of corrosion products.

While other modifications of the invention and variations thereof which may be employed within the scope of the invention have not been described, the invention is intended to include such as may be embraced within the following claims:

What we claim as new and desire to secure by Letters Patent of the United States is:

1. A composite sulfur electrode container for use as a portion of a sodium-sulfur cell which comprises an outer metallic casing portion readily corroded by liquid sulfur and polysulfides, the outer casing having opposite open ends, a metallic foil portion substantially corrosion resistant to liquid sulfur and polysulfides bonded to the inner surface of the outer casing portion, a chromium layer portion bonded to the opposite surface of the foil portion, the chromium layer portion containing in excess of 60 weight percent chromium, a metallic end cap adapted to fit and to be sealed within and adjacent one open end of the container, and at least the inner surface of the end cap substantially corrosion resistant to liquid sulfur and polysulfides.

2. A composite sulfur electrode container as in claim 1, in which the end cap is fitted and sealed within and adjacent one open end of the container.

3. A composite sulfur electrode container as in claim 1, in which the end cap is fitted and sealed within and adjacent one open end of the container, and the inner surface of the end cap consists of a foil portion bonded to the end cap and a chromium layer bonded to the opposite surface of the foil portion, the chromium layer containing in excess of 60 weight percent chromium.

* * * * *

UNITED STATES PATENT AND TRADEMARK OFFICE
CERTIFICATE OF CORRECTION

PATENT NO. : 4,234,668
DATED : November 18, 1980
INVENTOR(S) : Dong-Sil Park, Manfred W. Breiter, Randall N. King It is certified that error appears in the above—identified patent and that said Letters Patent is hereby corrected as shown below:

Title sheet, left column, item 73, after Assignee:
"General Electric Company, Schenectady, N.Y." should read -- Electric Power Research Institute, Inc., Palo Alto, California --

Signed and Sealed this

Twelfth Day of May 1981

[SEAL]

Attest:

RENE D. TEGTMEYER

Attesting Officer     Acting Commissioner of Patents and Trademarks